US012803720B2

(12) United States Patent
Zhu

(10) Patent No.: US 12,803,720 B2
(45) Date of Patent: Nov. 17, 2026

(54) TIMING METHOD AND APPARATUS FOR DETERMINING HARQ FEEDBACK INFORMATION

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 438 days.

(21) Appl. No.: 18/555,126

(22) PCT Filed: Apr. 12, 2021

(86) PCT No.: PCT/CN2021/086590
§ 371 (c)(1),
(2) Date: Oct. 12, 2023

(87) PCT Pub. No.: WO2022/217425
PCT Pub. Date: Oct. 20, 2022

(65) Prior Publication Data
US 2024/0214130 A1 Jun. 27, 2024

(51) Int. Cl.
*H04L 1/1829* (2023.01)
*H04W 72/232* (2023.01)

(52) U.S. Cl.
CPC .......... *H04L 1/1861* (2013.01); *H04L 1/1854* (2013.01); *H04W 72/232* (2023.01)

(58) Field of Classification Search
CPC ... H04W 28/04; H04W 72/04; H04W 72/042; H04L 5/0007; H04L 1/1861
(Continued)

(56) References Cited

U.S. PATENT DOCUMENTS 11,722,263 B2 * 8/2023 Muruganathan ...... H04L 1/1822 370/329
2020/0106568 A1 * 4/2020 Tsai ...................... H04L 1/1854
(Continued)

FOREIGN PATENT DOCUMENTS

CN 106559198 A * 4/2017 ........... H04L 5/0053
CN 107528676 A * 12/2017 ............... H04L 1/18
(Continued)

OTHER PUBLICATIONS

CAICT. "Timing relationship enhancements to support NTN" 3GPP TSG RAN WG1 Meeting #104b-e E-meeting, R1-2102572, Apr. 7, 2021 (Apr. 7, 2021).
(Continued)

*Primary Examiner* — Jeffrey M Rutkowski
(74) *Attorney, Agent, or Firm* — Volpe Koenig

(57) ABSTRACT

A timing method for determining hybrid automatic repeat request (HARQ) feedback information, and the method includes: determining, by a terminal device, a time position where the HARQ feedback information is located according to indication information indicating that a value number is greater than a value indicated by a timing indication domain from a physical downlink shared channel (PDSCH) to the HARQ feedback information in downlink control information (DCI), or determining a time position where the feedback information is located according to indication information configured to instruct a terminal device according to a predefined rule.

18 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0045100 | A1* | 2/2021 | Park | H04L 1/1854 |
| 2021/0274528 | A1* | 9/2021 | Papasakellariou | H04L 1/1861 |
| 2021/0378003 | A1* | 12/2021 | Yang | H04L 1/1896 |
| 2023/0155789 | A1* | 5/2023 | Zhang | H04L 1/1812 370/329 |
| 2023/0188265 | A1* | 6/2023 | Lee | H04L 1/1812 370/329 |
| 2023/0189287 | A1* | 6/2023 | Gao | H04L 5/0055 370/329 |
| 2023/0239869 | A1* | 7/2023 | Wu | H04L 1/0026 370/329 |
| 2023/0261807 | A1* | 8/2023 | Bae | H04W 72/23 370/329 |
| 2023/0276490 | A1* | 8/2023 | Wu | H04L 1/1861 370/329 |
| 2023/0412320 | A1* | 12/2023 | Lei | H04L 1/1854 |

FOREIGN PATENT DOCUMENTS

| | | | | | |
|---|---|---|---|---|---|
| CN | 109496398 | A | * | 3/2019 | H04L 1/18 |
| CN | 111585727 | A | * | 8/2020 | H04L 1/18 |
| CN | 112422246 | A | * | 2/2021 | H04L 1/1812 |
| JP | WO 2020/027143 | A1 | * | 2/2020 | H04W 28/04 |
| WO | WO 2019/028196 | A1 | * | 2/2010 | A61B 5/00 |
| WO | WO2017192025 | A1 | * | 11/2017 | H04L 1/18 |
| WO | 2019028916 | A1 | | 2/2019 | |
| WO | 2020027143 | A1 | | 2/2020 | |

OTHER PUBLICATIONS

Huawei et al. "Discussion on timing relationship enhancements for NTN" 3GPP TSG RAN WG1 Meeting #104bis-e E-meeting, R1-2102341, Apr. 7, 2021 (Apr. 7, 2021).
ZTE. "Discussion on timing relationship for NR-NTN" 3GPP TSG RAN WG1 Meeting #104bis-e E-meeting, R1-2102914, Apr. 7, 2021 (Apr. 7, 2021).
Huawei, HiSilicon, "HARQ enhancements in NR unlicensed", 3GPP TSG RAN WG1 Meeting #98bis, R1-1910047, Chongqing, China, Oct. 14-20, 2019.
Research on downlink HARQ feedback information scheduling for TD-LTE terminals (2013).

* cited by examiner

TIMING METHOD AND APPARATUS FOR DETERMINING HARQ FEEDBACK INFORMATION

CROSS REFERENCE TO RELATED APPLICATION

The present application is a U.S. National Stage of International Application No. PCT/CN2021/086590, filed on Apr. 12, 2021, the contents of all of which are incorporated herein by reference in their entirety for all purposes.

BACKGROUND

Data transmission efficiency of a new radio (NR) system is improved with a hybrid automatic repeat request (HARQ) mechanism. A network device transmits downlink service data through a physical downlink shared channel (PDSCH). After receiving the information service data, a terminal device feeds back HARQ feedback information received by the terminal device for the downlink service data on a physical uplink control channel (PUCCH) or a physical uplink shared channel (PUSCH). The HARQ feedback information can be an acknowledgement (ACK) or a non-acknowledgement (NACK).

SUMMARY

In a first aspect, an example of the disclosure provides a timing method for determining HARQ feedback information. The method is performed by a terminal device. The method includes: determining a time position where the HARQ feedback information is located according to indication information. A value number indicated by the indication information is greater than a value indicated by a timing indication domain from a physical downlink shared channel (PDSCH) to the HARQ feedback information in downlink control information (DCI). The value number is a value number of a time unit interval number between the physical downlink shared channel (PDSCH) and the hybrid automatic repeat request (HARQ) feedback information, or the indication information is configured to instruct the terminal device to determine the time position according to a predefined rule.

In a second aspect, an example of the disclosure provides another timing method for determining HARQ feedback information. The method is performed by a network device. The method includes: transmitting indication information to a terminal device. A value number indicated by the indication information is greater than a value indicated by a timing indication domain from a PDSCH to HARQ feedback information in DCI. The value number is a value number of a time unit interval number between the physical downlink shared channel (PDSCH) and the hybrid automatic repeat request (HARQ) feedback information, or the indication information is configured to instruct the terminal device to determine a time position where the HARQ feedback information is located according to a predefined rule.

In a third aspect, an example of the disclosure provides a timing apparatus for determining HARQ feedback information. The apparatus includes a processor and a memory. The memory stores a computer program. The processor executes the computer program stored in the memory, such that the apparatus executes the method according to the first aspect.

In an fourth aspect, an example of the disclosure provides a timing apparatus for determining HARQ feedback information. The apparatus includes a processor and a memory.

The memory stores a computer program. The processor executes the computer program stored in the memory, such that the apparatus executes the method according to the second aspect.

In a fifth aspect, an example of the disclosure provides a timing apparatus for determining HARQ feedback information. The apparatus includes a processor and an interface circuit. The interface circuit is configured to receive a code instruction and transmit the code instruction to the processor. The processor is configured to run the code instruction so as to execute the method according to the first aspect.

In a sixth aspect, an example of the disclosure provides a timing apparatus for determining HARQ feedback information. The apparatus includes a processor and an interface circuit. The interface circuit is configured to receive a code instruction and transmit the code instruction to the processor. The processor is configured to run the code instruction so as to execute the method according to the second aspect.

In a seventh aspect, an example of the disclosure provides a non-transitory computer-readable storage medium. The non-transitory computer-readable storage medium is configured to store an instruction used by the network device. The terminal device executes the method according to the first aspect when the instruction is executed.

In an eighth aspect, an example of the disclosure provides a non-transitory computer-readable storage medium. The non-transitory computer-readable storage medium is configured to store an instruction used by the terminal device. The network device executes the method according to the second aspect when the instruction is executed.

BRIEF DESCRIPTION OF THE DRAWINGS

In order to more clearly describe technical solutions in examples of the disclosure or the background art, the accompanying drawings required for the examples of the disclosure or the background art will be illustrated below.

DETAILED DESCRIPTION

The disclosure relates to the technical field of communication, and particularly relates to a timing method and apparatus for determining hybrid automatic repeat request (HARQ) feedback information, which may be applied to a scene of communication between a terminal device and a network device in a cellular mobile communication technology, such that the terminal device can accurately determine a time position where the HARQ feedback information is located on the basis of indication information, and further reliable transmission of the HARQ feedback information can be ensured.

For better understanding of a timing method for determining hybrid automatic repeat request (HARQ) feedback information according to examples of the disclosure, a communication system applicable to the examples of the disclosure will be described below.

Figure 1:
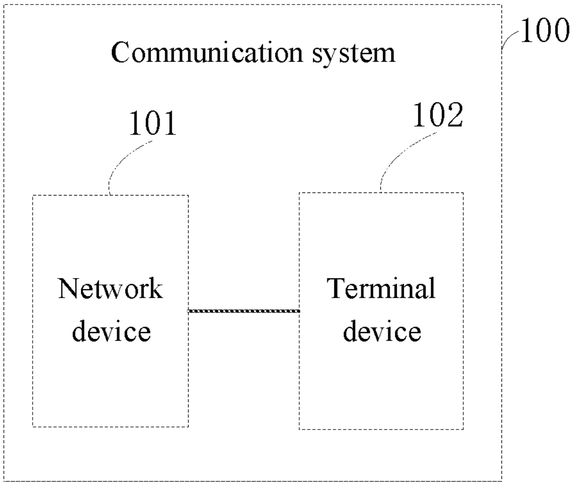
FIG. 1 is a schematic diagram of a framework of a communication system according to an example of the disclosure.

With reference to FIG. 1, FIG. 1 is a schematic diagram of a framework of a communication system 100 according to an example of the disclosure. The communication system 100 may include, but is not limited to, a network device and a terminal device. The number and form of the devices shown in FIG. 1 are only illustrative and do not limit the examples of the disclosure. In practical application, the communication system may include two or more network devices and two or more terminal devices. For instance, the communication system 100 shown in FIG. 1 may include a network device 101 and a terminal device 102.

It should be noted that technical solutions of the examples of the disclosure may be applied to various communication systems, such as a long term evolution (LTE) system, a 5th generation (5G) mobile communication system, a 5G new radio (NR) system, or other novel mobile communication systems in the future.

The network device 101 in the example of the disclosure is an entity configured to transmit or receive a signal on a network side. For instance, the network device 101 may be an evolved NodeB (eNB), a transmission reception point (TRP), a next generation NodeB (gNB) in the NR system, a base station in other future mobile communication systems, or an access node in a wireless fidelity (WiFi) system. The example of the disclosure does not limit a specific technology or a specific device form used by the network device. The network device, according to the example of the disclosure, may be composed of a central unit (CU) and a distributed unit (DU). The CU may also be referred to as a control unit. With a structure of CU-DU, protocol layers of the network device, for instance, a base station, may be separated. Functions of some protocol layers are centrally controlled by the CU, while functions of the other or all protocol layers are distributed in the DU, and the DU is centrally controlled by the CU.

The terminal device 102 in the example of the disclosure is an entity, for instance, a mobile phone, configured to receive or transmit a signal on a user side. The terminal device may also be referred to as a terminal, user equipment (UE), a mobile station (MS), a mobile terminal (MT), etc. The terminal device may be a vehicle having a communication function, an intelligent vehicle, a mobile phone, a wearable device, Pad, a computer having a radio transceiving function, a virtual reality (VR) terminal device, an augmented reality (AR) terminal device, a radio terminal device in industrial control, a radio terminal device in self-driving, a radio terminal device in remote medical surgery, a radio terminal device in smart grid, a radio terminal device in transportation safety, a radio terminal device in smart city, a radio terminal device in smart home, etc. The example of the disclosure does not limit a specific technology and a specific device form used by the terminal device.

In the communication system, a time unit offset between a time unit where a physical downlink shared channel (PDSCH) is located and a time unit where a terminal transmits the HARQ feedback information is generally received with a timing indication domain from the PDSCH to the HARQ feedback information in downlink control information (DCI). Further, a time unit where the HARQ feedback information is located is determined on the basis of the time unit offset. However, a maximum time unit offset indicated by the timing indication domain from the PDSCH to the HARQ feedback information is relatively small. When no available uplink time domain resources can be found to bear HARQ feedback due to the existence of enormous continuous downlink time domain resources configured for the terminal device, a time position where the terminal transmits the HARQ feedback information cannot be determined in an existing design, and further reliable transmission of the HARQ feedback information cannot be ensured.

In the example of the disclosure, the terminal device determines the time position where the HARQ feedback information is located according to the indication information. A value indicated by the indication information is greater than a value indicated by the timing indication domain from the PDSCH to the HARQ feedback information in the DCI. Alternatively, the time position where the feedback information is located is accurately determined according to the indication information configured to instruct the terminal device according to a predefined rule. Further, reliable transmission of the HARQ feedback information can be ensured.

It may be understood that the communication system described in the examples of the disclosure is intended to describe the technical solutions of the examples of the disclosure more clearly, instead of limiting the technical solutions according to the examples of the disclosure. Those of ordinary skill in the art may know that the technical solutions according to the examples of the disclosure are also applicable to similar technical problems with the evolution of a system structure and the emergence of new business cases.

The timing method and apparatus for determining HARQ feedback information according to the disclosure will be described in detail with reference to the accompanying drawings below.

Figure 2:
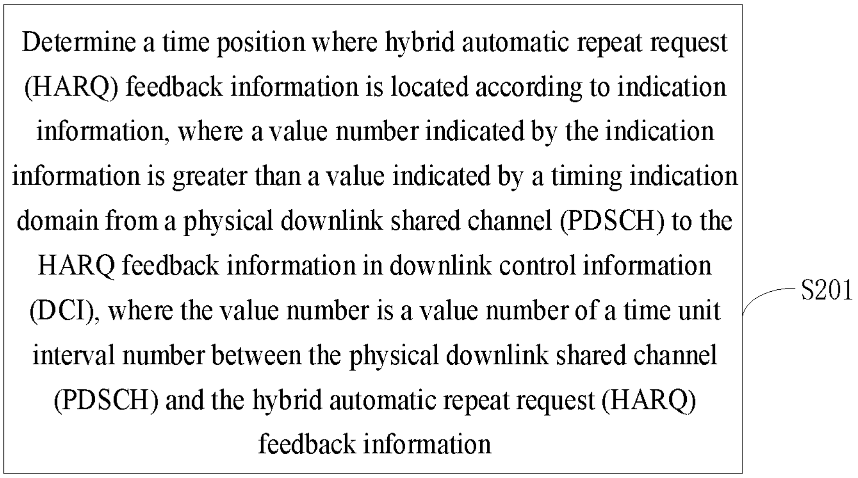
FIG. 2 is a schematic flow diagram of a timing method for determining hybrid automatic repeat request (HARQ) feedback information according to an example of the disclosure.

With reference to FIG. 2, FIG. 2 is a schematic flow diagram of a timing method for determining HARQ feedback information according to an example of the disclosure. The method is performed by a terminal device in the communication system shown in FIG. 1. That is, the method is executed by the terminal device in the communication system shown in FIG. 1. As shown in FIG. 2, the method may include, but is not limited to, step S201.

S201: a time position where the HARQ feedback information is located is determined according to the indication information. A value number indicated by the indication information is greater than a value indicated by a timing indication domain from a PDSCH to the HARQ feedback information in DCI. The value number is a value number of a time unit interval number between the physical downlink shared channel (PDSCH) and the hybrid automatic repeat request (HARQ) feedback information.

The value indicated by a timing indication domain from a PDSCH to the HARQ feedback information in DCI may be the value indicated by the "PDSCH-To-HARQ feedback timing indicator" field in the DCI.

In an example, a maximum value indicated by the timing indication domain from the PDSCH to the HARQ feedback information in the DCI is a maximum value of the time unit interval number between the PDSCH and the HARQ feedback information specified in a current protocol. In some examples, the maximum value indicated by the timing indication domain from the PDSCH to the HARQ feedback information in the DCI may be 15. That is, the maximum value of the time unit interval number between the PDSCH and the HARQ feedback information specified in the current protocol is 15 time units.

In some examples, the indication information may indicate that the value number of the time unit interval number between the PDSCH and the HARQ feedback information may be 32, 64, etc., which is not specifically limited by the example.

In some other examples, the maximum value, indicated by the indication information, of the time unit interval number between the PDSCH and the HARQ feedback information in the example may be a product of the maximum value, indicated by the timing indication domain from the PDSCH to the HARQ feedback information in the DCI, of the time unit interval number between the PDSCH and the HARQ feedback information and $2^n$, where n is a positive integer. For instance, if n is 1, the maximum value, specified in the current protocol, indicated by the timing indication domain from the PDSCH to the HARQ feedback information in the DCI is 8. Accordingly, the maximum value, indicated by the indication information, of the time unit interval number between the PDSCH and the HARQ feedback information in the example is 16.

In order to enable the terminal device to accurately determine its time position in a downlink time domain resource scene in some other examples, a desirable value number of the indication information may be determined according to a downlink time unit number in a frame structure deployed for the terminal device. In some examples, in response to determining that the downlink time unit number is smaller than or equal to 32, the desirable value number indicated by the indication information may be 32. In response to determining that the downlink time unit number is greater than 32 and smaller than or equal to 64, the desirable value number indicated by the indication information may be 64. That is, the value number indicated by the indication information is greater than the downlink time unit number in the frame structure deployed for the terminal device.

It should be noted that the example conducts an illustrative description with a time unit as a slot in the following instances, unless otherwise specified.

In the example, a possible embodiment of the step that the time position where the HARQ feedback information is located is determined according to the indication information includes the following steps: a value of the time unit interval number between the PDSCH and the HARQ feedback information is determined according to the indication information; and the time position where the HARQ feedback information is located is determined according to the value of the time unit interval number between the PDSCH and the HARQ feedback information.

In the example of the disclosure, the terminal device can accurately determine the time position where the HARQ feedback information is located according to the indication information indicating that the value number is greater than the value indicated by the timing indication domain from the PDSCH to the HARQ feedback information in the DCI. Further, reliable transmission of the HARQ feedback information can be ensured.

Figure 3:
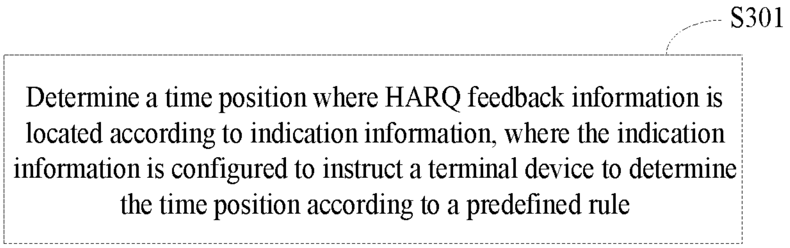
FIG. 3 is a schematic flow diagram of another timing method for determining HARQ feedback information according to an example of the disclosure.

With reference to FIG. 3, FIG. 3 is a schematic flow diagram of another timing method for determining HARQ feedback information according to an example of the disclosure. The method is performed by a terminal device in the communication system shown in FIG. 1. As shown in FIG. 3, the method may include, but is not limited to, step S301.

S301: a time position where the HARQ feedback information is located is determined according to the indication information. The indication information is configured to instruct the terminal device to determine the time position according to a predefined rule.

In some examples, the predefined rule may be to feed back the HARQ feedback information for a PDSCH scheduled this time on a latest subsequent uplink time unit.

As an example, the terminal device may receive DCI transmitted from a network device and obtain a timing indication domain from the PDSCH to the HARQ feedback information from the DCI, if the timing indication domain from the PDSCH to the HARQ feedback information instructs the terminal device to determine the time position according to the predefined rule. Assuming that the predefined rule is to enable the terminal device to satisfy the latest uplink time unit after PDSCH processing time, the terminal device may obtain an uplink time unit after a time unit where PDSCH transmission is located and with a smallest distance from the time unit where the PDSCH transmission is located on the basis of the predefined rule, and regard the obtained uplink time unit as the time position where the HARQ feedback information is located.

For instance, if the network device is a base station, the base station transmits a scheduling instruction on a 7th slot and schedules the PDSCH transmission on the 7th slot. After the terminal device receives the scheduling instruction transmitted from the base station on the 7th slot, it is found that the timing indication domain from the PDSCH to the HARQ feedback information instructs the terminal device to determine the time position according to the predefined rule. In this way, the terminal device may regard an uplink slot after the 7th slot and with a smallest distance from the 7th slot as the time position where the HARQ feedback information is located. Assuming that the obtained uplink slot is a 24th slot, the HARQ feedback information for the PDSCH scheduled on the 7th slot may be transmitted on the 24th slot.

In the example of the disclosure, in response to determining that the indication information instructs the terminal device to determine the time position where the HARQ feedback information is located according to the predefined rule after the terminal device receives the indication information, the terminal device determines the time position where the HARQ feedback information is located according to the predefined rule. Thus, in response to determining that the indication information indicates no time unit interval number, the terminal device can accurately determine the time position where the HARQ feedback information is located on the basis of the predefined rule. Further, reliable transmission of the HARQ feedback information can be ensured.

Figure 4:
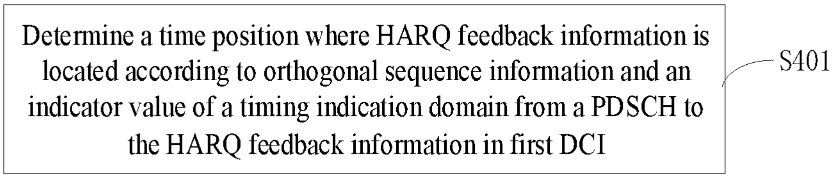
FIG. 4 is a schematic flow diagram of yet another timing method for determining HARQ feedback information according to an example of the disclosure.

With reference to FIG. 4, FIG. 4 is a schematic flow diagram of yet another timing method for determining HARQ feedback information according to an example of the disclosure. The method is performed by a terminal device in the communication system shown in FIG. 1. It should be noted that the example conducts description with indication information including orthogonal sequence information configured to scramble first DCI and a timing indication domain from a PDSCH to the HARQ feedback information in the first DCI as an instance. As shown in FIG. 4, a possible embodiment of S201 may include step S401.

S401: a time position where the HARQ feedback information is located is determined according to the orthogonal sequence information and an indicator value of the timing indication domain from the PDSCH to the HARQ feedback information in the first DCI.

In order to accurately determine the time position where the HARQ feedback information is located by jointly using the orthogonal sequence information and the indicator value of the timing indication domain from the PDSCH to the HARQ feedback information in the first DCI in some examples. A possible embodiment of the step that the time position where the HARQ feedback information is located is determined according to the orthogonal sequence information and the indicator value of the timing indication domain from the PDSCH to the HARQ feedback information in the first DCI includes the following steps: the orthogonal sequence information and the indicator value of the timing indication domain from the PDSCH to the HARQ feedback information in the first DCI are spliced, and a spliced value is obtained; and the time position where the HARQ feedback information is located is determined according to the spliced value.

As an example, the orthogonal sequence information and the indicator value of the timing indication domain from the PDSCH to the HARQ feedback information in the first DCI are spliced, and the spliced value is obtained; and a time unit interval number between the PDSCH and the HARQ feedback information is determined according to the spliced value, and the time position where the HARQ feedback information is located is determined according to the time unit interval number.

In a possible embodiment, the step that the orthogonal sequence information and the indicator value of the timing indication domain from the PDSCH to the HARQ feedback information in the first DCI are spliced, and the spliced value is obtained, may include the following step: the orthogonal sequence information is spliced before the indicator value from the PDSCH to the HARQ feedback information in the first DCI, and the spliced value is obtained. That is, N-bit indication information indicated by the orthogonal sequence information may be used as a high bit of the indicator value of the timing indication domain from the PDSCH to the HARQ feedback information.

N is a positive integer. For instance, if N is 1, 1-bit indication information indicated by the orthogonal sequence information may be used as a highest bit of the indicator value of the timing indication domain from the PDSCH to the HARQ feedback information. For instance, the 1-bit indication information of orthogonal sequence information is 1, and the indicator value of the timing indication domain from the PDSCH to the HARQ feedback information is 0001. Accordingly, according to the orthogonal sequence information and the indicator value of the timing indication domain from the PDSCH to the HARQ feedback information, it may be determined that bit information corresponding to a slot interval number between the PDSCH and the HARQ feedback information is 10001, and a decimal value of the slot interval number corresponding to the bit information is 17. Assuming that a slot where the terminal device receives PDSCH transmission is a 7th slot, it may be determined that the time position where the HARQ feedback information is located is a 24th slot. That is, the HARQ feedback information may be transmitted in the 24th slot.

For another instance, the above orthogonal sequence is 4, bit information corresponding to an orthogonal sequence 1 is 00, bit information corresponding to an orthogonal sequence 2 is 01, bit information corresponding to an orthogonal sequence 3 is 10, and bit information corresponding to an orthogonal sequence 4 is 11. Accordingly, in response to determining that the orthogonal sequence information obtained by the terminal device is the orthogonal sequence 1, the bit information represented by the orthogonal sequence 3 is 10, and the indicator value of the timing indication domain from the PDSCH to the HARQ feedback information is 0001. Accordingly, according to the orthogonal sequence information and the indicator value of the timing indication domain from the PDSCH to the HARQ feedback information, it may be determined that the bit information corresponding to the slot interval number between the PDSCH and the HARQ feedback information is 100001, and a decimal value corresponding to the bit information is 33. Assuming that the slot where the terminal device receives the PDSCH transmission is the 7th slot, it may be determined that the time position where the HARQ feedback information is located is a 40th slot. That is, the HARQ feedback information for the PDSCH scheduled on the 7th slot may be transmitted in the 40th slot.

In another possible embodiment, the step that the orthogonal sequence information and the indicator value of the timing indication domain from the PDSCH to the HARQ feedback information in the first DCI are spliced, and the spliced value is obtained may include the following step: the orthogonal sequence information is spliced after the indicator value from the PDSCH to the HARQ feedback information in the first DCI, and the spliced value is obtained. That is, in a possible embodiment, N-bit indication information indicated by the orthogonal sequence information may be used as a low bit of the indicator value of the timing indication domain from the PDSCH to the HARQ feedback information.

N is a positive integer. For instance, if N is 1, 1 bit indication information indicated by the orthogonal sequence information may be used as a lowest bit of the indicator value of the timing indication domain from the PDSCH to the HARQ feedback information.

It should be understood that the timing indication domain from the PDSCH to the HARQ feedback information is expanded with the orthogonal sequence information in the example, such that the value number indicated by the indication information may be expanded. For instance, the value number only on the basis of the timing indication domain from the PDSCH to the HARQ feedback information is 16. If the orthogonal sequence information is represented with 2 bits, the value number of the indicator value that may be determined on the basis of the orthogonal sequence information and the timing indication domain from the PDSCH to the HARQ feedback information is 64.

For another instance, the value number of the indicator value only on the basis of the timing indication domain from the PDSCH to the HARQ feedback information is 16. If the orthogonal sequence information is represented with 1 bit, the value number of the indicator value that may be determined on the basis of the orthogonal sequence information and the timing indication domain from the PDSCH to the HARQ feedback information is 32.

In the example, the time position where the HARQ feedback information is located is determined according to the orthogonal sequence information and the indicator value of the timing indication domain from the PDSCH to the HARQ feedback information. Thus, the value number of the time unit interval number between the PDSCH and the HARQ feedback information is expanded with the orthogonal sequence information, such that a terminal can accurately determine the time position where the HARQ feedback information is located by jointly using the orthogonal sequence information and the indicator value of the timing indication domain from the PDSCH to the HARQ feedback information in the indication information. Further, reliable transmission of the HARQ feedback information can be ensured.

In order to reduce influence on the first DCI and conveniently obtain the orthogonal sequence information in an example of the disclosure, a method for obtaining the orthogonal sequence information may include the following steps: a cyclic redundancy check (CRC) in the first DCI is obtained; and the CRC is descrambled, and the orthogonal sequence information is obtained.

Figure 5:
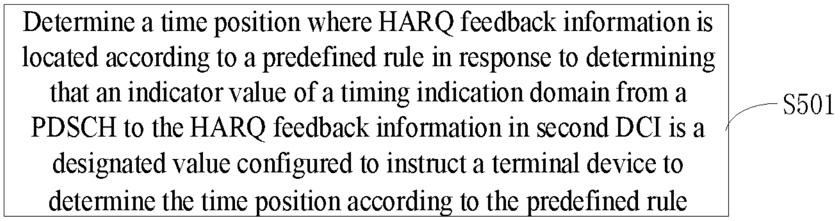
FIG. 5 is a schematic flow diagram of yet another timing method for determining HARQ feedback information according to an example of the disclosure.

With reference to FIG. 5, FIG. 5 is a schematic flow diagram of yet another timing method for determining HARQ feedback information according to an example of the disclosure. The method is performed by a terminal device in the communication system shown in FIG. 1. It should be noted that the example conducts description with indication information including a timing indication domain from a PDSCH to the HARQ feedback information in second DCI as an instance. As shown in FIG. 5, a possible embodiment of S201 includes step S501.

S501: a time position where the HARQ feedback information is located is determined according to a predefined rule in response to determining that an indicator value of the timing indication domain from the PDSCH to the HARQ feedback information in the second DCI is a designated value configured to instruct the terminal device to determine the time position according to the predefined rule.

In an example, the terminal device may obtain the indicator value of the timing indication domain from the PDSCH to the HARQ feedback information in the second DCI after obtaining the timing indication domain from the PDSCH to the HARQ feedback information in the second DCI. Whether the indicator value of the timing indication domain from the PDSCH to the HARQ feedback information in the second DCI is the designated value configured to instruct the terminal device to determine the time position according to the predefined rule may be determined according to an indicator value set in a communication protocol. In response to determining that the indicator value is the designated value, the time position where the HARQ feedback information is located is determined according to the predefined rule.

In another example, the terminal device may obtain the preconfigured indicator value set after obtaining the timing indication domain from the PDSCH to the HARQ feedback information in the second DCI. Further, whether the indicator value of the timing indication domain from the PDSCH to HARQ feedback information in the second DCI is the designated value configured to instruct the terminal device to determine the time position according to the predefined rule may be determined according to the preconfigured indicator value set. The time position where the HARQ feedback information is located is determined according to the predefined rule in response to determining that the indicator value of the timing indication domain from the PDSCH to the HARQ feedback information in the second DCI is the designated value configured to instruct the terminal device to determine the time position according to the predefined rule.

The preconfigured indicator value set is preconfigured for the terminal device by a network device through high level signaling.

The predefined rule may be to obtain a first available uplink time unit after a time unit where PDSCH transmission is located and satisfying a processing time requirement.

The processing time requirement is determined by the terminal device itself. The processing time requirement is a time requirement required for the terminal device to process the PDSCH transmission and generate the HARQ feedback information corresponding to the PDSCH transmission. For instance, the processing time requirement may be 17 time units.

In order to accurately determine an uplink time unit suitable for the HARQ feedback information in an example of the disclosure, a possible embodiment of the step that the time position where the HARQ feedback information is located is determined according to the predefined rule includes the following steps: a first available uplink time unit after a reception time unit of the PDSCH transmission and with a distance from reception time being greater than or equal to the processing time requirement is obtained; and the first available uplink time unit is determined to be the time position where the HARQ feedback information is located.

Figure 6:
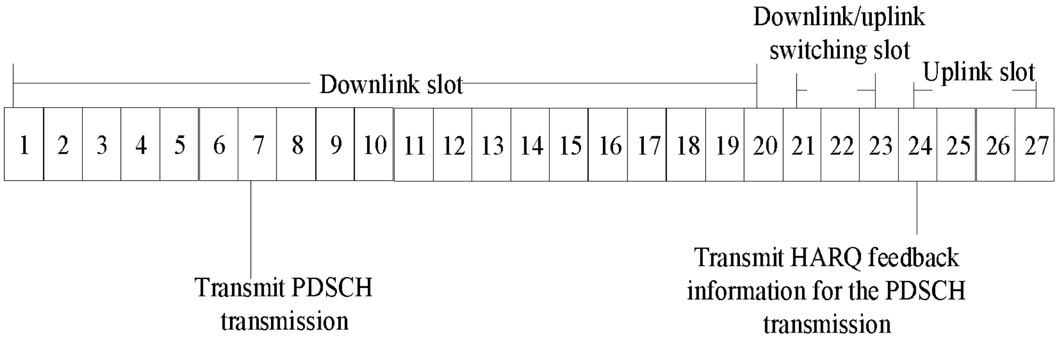
FIG. 6 is a schematic diagram of transmission slots according to an example of the disclosure.

For instance, if the network device is a base station as shown in FIG. 6, the base station transmits a scheduling instruction on a 7th slot and schedules the PDSCH transmission on the 7th slot. After the terminal device receives the scheduling instruction transmitted from the base station on the 7th slot, it is found that the indicator value of the timing indication domain from the PDSCH to the HARQ feedback information inside is the designated value configured to instruct the terminal device to determine the time position according to the predefined rule. Assuming that the processing time requirement of the terminal device is 15 slots, the terminal device is to satisfy the processing time requirement after the 7th slot, and a first available uplink slot is a 24th slot. Assuming that the obtained uplink slot is the 24th slot, the HARQ feedback information for the PDSCH scheduled on the 7th slot may be transmitted on the 24th slot.

In the example, the terminal device obtains the timing indication domain from the PDSCH to the HARQ feedback information in the DCI after receiving the DCI. The time position where the HARQ feedback information is located is determined according to the predefined rule in response to determining that the indicator value of the timing indication domain from the PDSCH to the HARQ feedback information is the designated value configured to instruct the terminal device to determine the time position according to the predefined rule. Thus, the terminal device can accurately determine the time position where the HARQ feedback information is located. Further, reliable transmission of the HARQ feedback information can be ensured.

Figure 7:
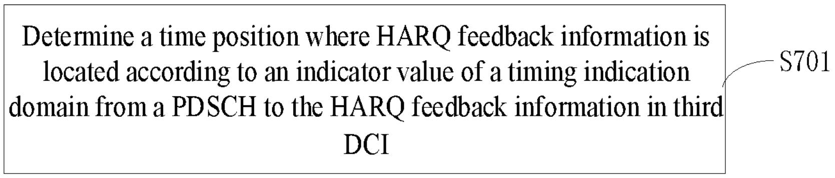
FIG. 7 is a schematic flow diagram of still another timing method for determining HARQ feedback information according to an example of the disclosure.

With reference to FIG. 7, FIG. 7 is a schematic flow diagram of still another timing method for determining HARQ feedback information according to an example of the disclosure. The method is performed by a terminal device in the communication system shown in FIG. 1. It should be noted that the example conducts description with indication information including a timing indication domain from a PDSCH to the HARQ feedback information in third DCI as an instance. As shown in FIG. 7, a possible embodiment of S201 includes, but is not limited to, step S701.

S701: a time position where the HARQ feedback information is located is determined according to an indicator value of the timing indication domain from the PDSCH to the HARQ feedback information in the third DCI.

In order to accurately determine the time position where the HARQ feedback information is located in an example of the disclosure, a possible embodiment of the step that the time position where the HARQ feedback information is located is determined according to the indicator value of the timing indication domain from the PDSCH to the HARQ feedback information in the third DCI includes the following steps: a value of a time unit interval number between the PDSCH and the HARQ feedback information is determined according to the indicator value of the timing indication domain from the PDSCH to the HARQ feedback information in the third DCI; and the time position where the HARQ feedback information is located is determined according to the value of the time unit interval number.

A value number of the indicator value of the timing indication domain from the PDSCH to the HARQ feedback information in the third DCI in the example is greater than that of an indicator value indicated by a timing indication domain from the PDSCH to the HARQ feedback information in DCI in a current protocol. That is, a bit number of the timing indication domain from the PDSCH to the HARQ feedback information in the current protocol is expanded, for instance, from original 3 bits to 4 bits, or from original 4 bits to 5 bits.

In some examples of the disclosure, a maximum value indicated by the timing indication domain from the PDSCH to the HARQ feedback information in the current protocol in the DCI may be 15. That is, the maximum value of the time unit interval number between the PDSCH and the HARQ feedback information specified in the current protocol is 15 time units.

In some examples, after the bit number of the timing indication domain from the PDSCH to the HARQ feedback information in the current protocol is expanded, the indication information may indicate that the value number of the time unit interval number between the PDSCH and the HARQ feedback information may be 32, 64, etc., which is not specifically limited by the example.

In some other examples, the maximum value, indicated by the timing indication domain from the PDSCH to the HARQ feedback information in the third DCI, of the time unit interval number between the PDSCH and the HARQ feedback information in the example may be a product of the maximum value, indicated by the timing indication domain from the PDSCH to the HARQ feedback information in the DCI, of the time unit interval number between the PDSCH and the HARQ feedback information and $2^n$, where n is a positive integer. For instance, if n is 1, the maximum value, specified in the current protocol, indicated by the timing indication domain from the PDSCH to the HARQ feedback information in the DCI is 8. Accordingly, the maximum value, indicated by the timing indication domain from the PDSCH to the HARQ feedback information in the third DCI, of the time unit interval number between the PDSCH and the HARQ feedback information in the example is 16.

In order to enable the terminal device to accurately determine its time position in a downlink time domain resource scene in some other examples, a desirable value number of the indication information may be determined according to a downlink time unit number in a frame structure deployed for the terminal device.

As an example, the bit number of the timing indication domain from the PDSCH to the HARQ feedback information may be 4 bits in response to determining that a continuous downlink time unit number involved in the frame structure deployed for the terminal device by the network device is smaller than or equal to 32.

In some other examples, the value number of the indicator value of the timing indication domain from the PDSCH to the HARQ feedback information in the third DCI may be 32. That is, the value number, indicated by the timing indication domain from the PDSCH to the HARQ feedback information in the third DCI, of the time unit interval number between the PDSCH and the HARQ feedback information may be 32. In order to enable the timing indication domain from the PDSCH to the HARQ feedback information in the third DCI to indicate 32 indicator values in some examples, the bit number of the timing indication domain from the PDSCH to the HARQ feedback information in the third DCI may be 5 bits.

As an example, the bit number of the timing indication domain from the PDSCH to the HARQ feedback information in the third DCI may be 5 bits in response to determining that the continuous downlink time unit number involved in the frame structure deployed for the terminal device by the network device is greater than 32 and smaller than or equal to 64.

It should be noted that the example conducts illustration only with the bit number of the timing indication domain from the PDSCH to the HARQ feedback information in the third DCI being 4 bits or 5 bits as an instance. In practical application, the bit number of the timing indication domain from the PDSCH to the HARQ feedback information in the third DCI may be determined by the network device on the basis of the continuous downlink time unit number involved in the frame structure deployed for the terminal device.

Figure 8:
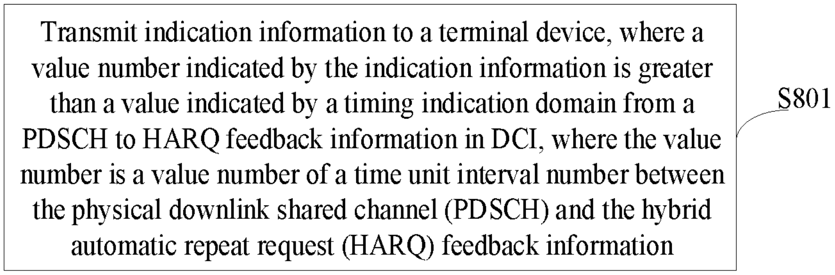
FIG. 8 is a schematic flow diagram of a timing method for determining HARQ feedback information according to an example of the disclosure.

With reference to FIG. 8, FIG. 8 is a schematic flow diagram of yet another timing method for determining HARQ feedback information according to an example of the disclosure. The method is performed by a network device in the communication system shown in FIG. 1. That is, the method may be executed by the network device in communication system shown in FIG. 1. As shown in FIG. 8, the method may include, but is not limited to, step S801.

S801: indication information is transmitted to a terminal device. A value number indicated by the indication information is greater than a value indicated by a timing indication domain from a PDSCH to the HARQ feedback information in DCI. The value number is a value number of a time unit interval number between the physical downlink shared channel (PDSCH) and the hybrid automatic repeat request (HARQ) feedback information.

In order to enable the terminal device to accurately determine its time position in a downlink time domain resource scene in some other examples, a desirable value number of the indication information may be determined according to a downlink time unit number in a frame structure deployed for the terminal device.

In the example of the disclosure, the network device transmits the indication information indicating that the value number is greater than the value indicated by the timing indication domain from the PDSCH to the HARQ feedback information in the DCI to the terminal device, such that the terminal device can accurately determine a time position where the HARQ feedback information is located on the basis of the received indication information. Further, reliable transmission of the HARQ feedback information can be ensured.

On the basis of the above examples, the indication information includes orthogonal sequence information configured to scramble the first DCI and a timing indication domain from the PDSCH to the HARQ feedback information in the first DCI in an example of the disclosure. The timing indication domain from the PDSCH to the HARQ feedback information in the first DCI and the orthogonal sequence information are configured to jointly indicate the time unit interval number between the PDSCH and the HARQ feedback information.

In order to enable the determined orthogonal sequence information to satisfy a requirement without wasting network resources in an example of the disclosure, a possible method for determining an orthogonal sequence number corresponding to the orthogonal sequence information includes the following steps: a continuous downlink time unit number involved in a frame structure deployed for the terminal device is obtained; and the orthogonal sequence number is determined according to the continuous downlink time unit number.

In some examples, an embodiment of the step that the orthogonal sequence number is determined according to the continuous downlink time unit number may include the following step: the orthogonal sequence number is determined to be 2 in response to determining that the continuous downlink time unit number is smaller than or equal to 32.

It may be understood that 1 bit may be configured to represent the orthogonal sequence information in response to determining the orthogonal sequence number to be 2.

In some other examples, an embodiment of the step that the orthogonal sequence number is determined according to the continuous downlink time unit number may include the following step: the orthogonal sequence number is determined to be 4 in response to determining that the continuous downlink time unit number is greater than 32 and smaller than or equal to 64.

It may be understood that 1 bit may be configured to represent the orthogonal sequence information in response to determining the orthogonal sequence number to be 2.

In order to reduce influence on the first DCI and conveniently obtain orthogonal information in a possible embodiment, the orthogonal information may be scrambled to a cyclic redundancy check (CRC) in the first DCI.

In the example, time unit interval data between the PDSCH and the HARQ feedback information is represented by jointly using the orthogonal sequence information and the timing indication domain from the PDSCH to the HARQ feedback information in the first DCI, such that a value number of the time unit interval data between the PDSCH and the HARQ feedback information may be increased. In this way, a problem of a HARQ feedback timing relation in a scene having more downlink time domain resources deployed is solved, and reliable transmission of HARQ information is ensured.

Figure 9:
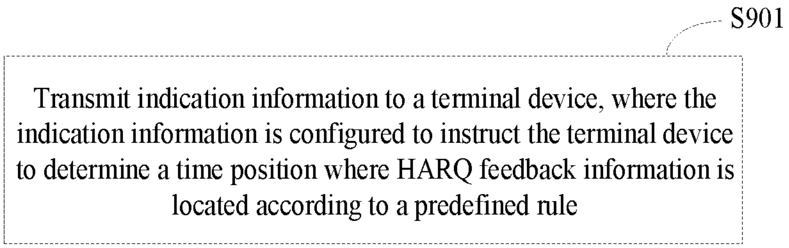
FIG. 9 is a schematic flow diagram of another timing method for determining HARQ feedback information according to an example of the disclosure.

With reference to FIG. 9, FIG. 9 is a schematic flow diagram of another timing method for determining HARQ feedback information according to an example of the disclosure. The method is performed by a network device in the communication system shown in FIG. 1. That is, the method may be executed by the network device in communication system shown in FIG. 1. As shown in FIG. 9, the method may include, but is not limited to, step S901.

S901: indication information is transmitted to a terminal device. The indication information is configured to instruct the terminal device to determine a time position where the HARQ feedback information is located according to a predefined rule.

In some examples, the indication information includes a timing indication domain from a PDSCH to the HARQ feedback information in the second DCI. An indicator value of the timing indication domain from the PDSCH to the HARQ feedback information in the second DCI is a designated value configured to instruct the terminal device to determine the time position according to the predefined rule.

In the example of the disclosure, the indication information configured to instruct the terminal device to determine the time position where the HARQ feedback information is located according to the predefined rule is transmitted to the terminal device, such that the terminal device determines the time position where the HARQ feedback information is located according to the predefined rule. Thus, in response to determining that the indication information indicates no time unit interval number, the terminal device can accurately determine the time position where the HARQ feedback information is located on the basis of the predefined rule. Further, reliable transmission of the HARQ feedback information can be ensured.

Figure 10:
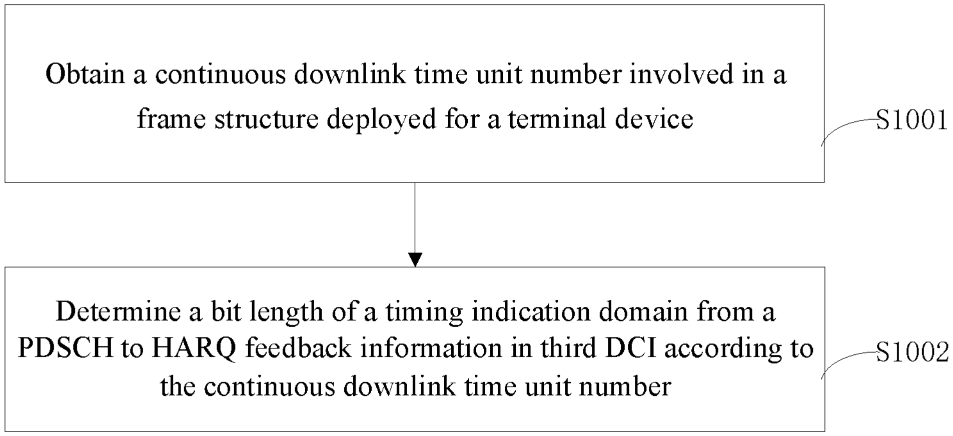
FIG. 10 is a schematic flow diagram of yet another timing method for determining HARQ feedback information according to an example of the disclosure.

With reference to FIG. 10, FIG. 10 is a schematic flow diagram of yet another timing method for determining HARQ feedback information according to an example of the disclosure. The method is performed by a network device in the communication system shown in FIG. 1. That is, the method may be executed by the network device in the communication system shown in FIG. 1. It should be noted that the indication information in the example includes a timing indication domain from a PDSCH to the HARQ feedback information in the third DCI. That is, the indication information in the example may be the timing indication domain from the PDSCH to the HARQ feedback information in the third DCI. As shown in FIG. 10, the method may further include, but is not limited to, steps S1001 and S1002.

S1001: a continuous downlink time unit number involved in a frame structure deployed for a terminal device is obtained.

S1002: a bit length of the timing indication domain from the PDSCH to the HARQ feedback information in the third DCI is determined according to the continuous downlink time unit number.

In some examples, a possible embodiment of the step that the bit length of the timing indication domain from the PDSCH to the HARQ feedback information is determined according to the continuous downlink time unit number includes the following steps: the bit length of the timing indication domain from the PDSCH to the HARQ feedback information in the third DCI is determined to be 4 bits in response to determining that the continuous downlink time unit number is smaller than or equal to 32; or the bit length of the timing indication domain from the PDSCH to the HARQ feedback information in the third DCI is determined to be 5 bits in response to determining that the continuous downlink time unit number is greater than 32 and smaller than or equal to 64.

In the example, the bit length of the timing indication domain from the PDSCH to the HARQ feedback information in the third DCI is determined according to the continuous downlink time unit number involved in the frame structure deployed for the terminal device, such that a value number indicated by the timing indication domain from the PDSCH to the HARQ feedback information in the third DCI is adapted to the continuous downlink time unit number deployed for the terminal device.

In the example according to the disclosure, the method according to the example of the disclosure is introduced from aspects of the network device and the terminal device separately. In order to achieve the functions of the method according to the example of the disclosure, the network device and the terminal device may include hardware structures and software modules. The above functions are achieved in the form of the hardware structure, the software module, or a combination of the hardware structure and the software module. One of the above functions may be implemented by a hardware structure, a software module, or a combination of a hardware structure and a software module.

Figure 11:
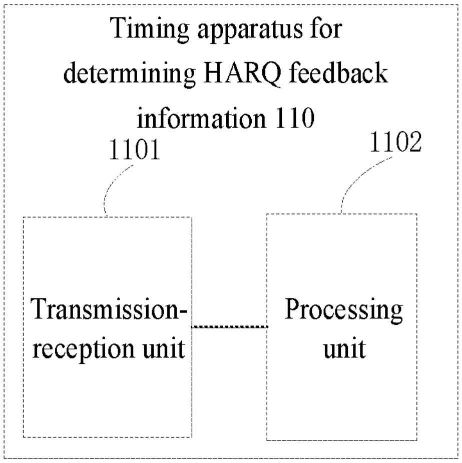
FIG. 11 is a schematic structural diagram of a timing apparatus for determining HARQ feedback information according to an example of the disclosure.

With reference to FIG. 11, FIG. 11 is a schematic structural diagram of a timing apparatus 110 for determining HARQ feedback information according to an example of the disclosure. The timing apparatus 110 for determining HARQ feedback information shown in FIG. 11 may include a transmission-reception unit 1101 and a processing unit 1102. The transmission-reception unit 1101 may include a transmission unit and/or a reception unit. The transmission unit is configured to achieve a transmission function, and the reception unit is configured to achieve a reception function. The transmission-reception unit 1101 may achieve the transmission function and/or the reception function.

The timing apparatus 110 for determining HARQ feedback information may be a network device, or an apparatus in a network device, or an apparatus capable of cooperating with a network device. Alternatively, the timing apparatus 110 for determining HARQ feedback information may be a terminal device, or an apparatus in a terminal device, or an apparatus capable of cooperating with a terminal device.

If the timing apparatus 110 for determining HARQ feedback information is the terminal device, the apparatus includes a processing unit 1102 configured to determine a time position where the HARQ feedback information is located according to indication information. A value number indicated by the indication information is greater than a value indicated by a timing indication domain from a PDSCH to the HARQ feedback information in DCI. The value number is a value number of a time unit interval number between the physical downlink shared channel (PDSCH) and the hybrid automatic repeat request (HARQ) feedback information. Alternatively, the indication information is configured to instruct the terminal device to determine the time position according to a predefined rule.

In a possible embodiment, the indication information includes orthogonal sequence information configured to scramble first DCI and a timing indication domain from the PDSCH to the HARQ feedback information in the first DCI. The processing unit 1102 is specifically configured to determine the time position where the HARQ feedback information is located according to the orthogonal sequence information and an indicator value of the timing indication domain from the PDSCH to the HARQ feedback information.

In a possible embodiment, a method for obtaining the orthogonal sequence information includes the following steps: a cyclic redundancy check (CRC) in the first DCI is obtained; the CRC is descrambled, and the orthogonal sequence information is obtained.

In a possible embodiment, the indication information includes a timing indication domain from the PDSCH to the HARQ feedback information in the second DCI. The processing unit 1102 is specifically configured to determine the time position where the HARQ feedback information is located according to the predefined rule in response to determining that an indicator value of the timing indication domain from the PDSCH to the HARQ feedback information in the second DCI is a designated value configured to instruct the terminal device to determine the time position according to the predefined rule.

In a possible embodiment, the processing unit 1102 is specifically configured to obtain a first available uplink time unit after a reception time unit of PDSCH transmission and with a distance from reception time being greater than or equal to a processing time requirement; and determine the first available uplink time unit to be the time position where the HARQ feedback information is located.

In a possible embodiment, the indication information includes a timing indication domain from the PDSCH to the HARQ feedback information in the third DCI. The processing unit 1102 is specifically configured to determine the time position where the HARQ feedback information is located according to an indicator value of the timing indication domain from the PDSCH to the HARQ feedback information in the third DCI.

In a possible embodiment, the processing unit 1102 is specifically configured to determine a value of the time unit interval number between the PDSCH and the HARQ feedback information according to the indication information; and determine the time position where the HARQ feedback information is located according to the value of the time unit interval number.

If the timing apparatus 110 for determining HARQ feedback information is the network device, the apparatus includes a transmission-reception unit 1101 configured to transmit the indication information to the terminal device. A value number indicated by the indication information is greater than a value indicated by a timing indication domain from a PDSCH to the HARQ feedback information in DCI. The value number is a value number of a time unit interval number between the physical downlink shared channel (PDSCH) and the hybrid automatic repeat request (HARQ) feedback information. Alternatively, the indication information is configured to instruct the terminal device to determine the time position where the HARQ feedback information is located according to a predefined rule.

In a possible embodiment, the indication information includes orthogonal sequence information configured to scramble the first DCI and a timing indication domain from the PDSCH to the HARQ feedback information in the first DCI. The timing indication domain from the PDSCH to the HARQ feedback information in the first DCI and the orthogonal sequence information are configured to jointly indicate the time unit interval number between the PDSCH and the HARQ feedback information.

In a possible embodiment, the processing unit 1102 is specifically configured to obtain a continuous downlink time unit number involved in a frame structure deployed for the terminal device; and determine a orthogonal sequence number according to the continuous downlink time unit number.

In a possible embodiment, the processing unit 1102 is specifically configured to determine the orthogonal sequence number to be 2 in response to determining that the continuous downlink time unit number is smaller than or equal to 32; or determine the orthogonal sequence number to be 4 in response to determining that the continuous downlink time unit number is greater than 32 and smaller than or equal to 64.

In a possible embodiment, the indication information includes a timing indication domain from the PDSCH to the HARQ feedback information in the second DCI. An indicator value of the timing indication domain from the PDSCH to the HARQ feedback information in the second DCI is a designated value configured to instruct the terminal device to determine the time position according to the predefined rule.

In a possible embodiment, the indication information includes a timing indication domain from the PDSCH to the HARQ feedback information in the third DCI. The processing unit 1102 is specifically configured to obtain a continuous downlink time unit number involved in a frame structure deployed for the terminal device; and determine a bit length of the timing indication domain from the PDSCH to the HARQ feedback information in the third DCI according to the continuous downlink time unit number.

In a possible embodiment, the processing unit 1102 is specifically configured to determine the bit length of the timing indication domain from the PDSCH to the HARQ feedback information in the third DCI to be 4 bits in response to determining that the continuous downlink time unit number is smaller than or equal to 32; or determine the bit length of the timing indication domain from the PDSCH to the HARQ feedback information in the third DCI to be 5 bits in response to determining that the continuous downlink time unit number is greater than 32 and smaller than or equal to 64.

Figure 12:
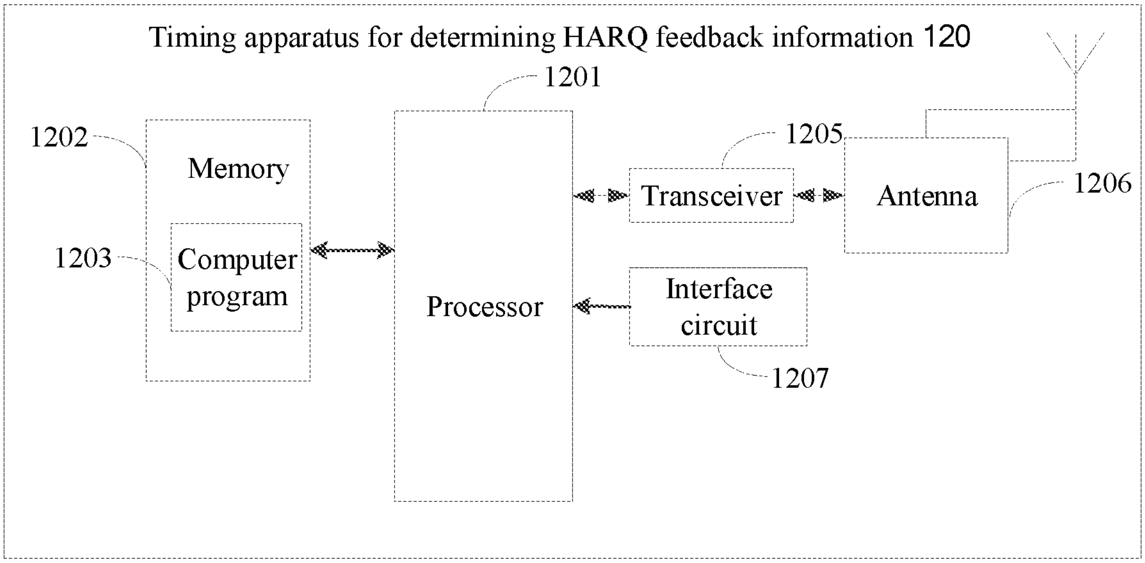
FIG. 12 is a schematic structural diagram of another timing apparatus for determining HARQ feedback information according to an example of the disclosure.

With reference to FIG. 12, FIG. 12 is a schematic structural diagram of another timing apparatus 120 for determining HARQ feedback information according to an example of the disclosure. The timing apparatus 120 for determining HARQ feedback information may be a network device, a terminal device, a chip, a chip system, or a processor that enables the network device to implement the above method, or a chip, a chip system, or a processor that enables the terminal device to implement the above method. The apparatus may be configured to implement the method described in the above method examples. Reference may be made to the description in the above method examples for details.

The timing apparatus 120 for determining HARQ feedback information may include one or more processors 1201. The processor 1201 may be a general-purpose processor, a special-purpose processor, etc. For instance, the processor may be a baseband processor or a central processing unit. The baseband processor may be configured to process a communication protocol and communication data. The central processing unit may be configured to control the timing apparatus 120 (for instance, a base station, a baseband chip, a terminal device, a terminal device chip, a DU or a CU) for determining HARQ feedback information, execute a computer program, and process data of the computer program.

Alternatively, the timing apparatus 120 for determining HARQ feedback information may further include one or more memories 1202. The memory may store a computer program 1203. The processor 1201 executes the computer program 1203, such that the timing apparatus 120 for determining HARQ feedback information executes the method described in the above method example. The computer program 1203 may be stored in the processor 1201. In this case, the processor 1201 may be implemented by hardware.

Alternatively, the memory 1202 may further store data. The timing apparatus 120 for determining HARQ feedback information and the memory 1202 may be arranged separately or integrated with each other.

Alternatively, the timing apparatus 120 for determining HARQ feedback information may further include a transceiver 1205 and an antenna 1206. The transceiver 1205 may be referred to as a transmission-reception unit, a transmission-reception machine, a transmission-reception circuit, etc., and is configured to achieve a transceiving function. The transceiver 1205 may include a receiver and a transmitter. The receiver may be referred to as a reception machine or a reception circuit, and is configured to achieve a reception function. The transmitter may be referred to as a transmission machine or a transmission circuit, and is configured to achieve a transmission function.

Alternatively, the timing apparatus 120 for determining HARQ feedback information may further include one or more interface circuits 1207. The interface circuit 1207 is configured to receive a code instruction and transmit the code instruction to the processor 1201. The processor 1201 runs the code instruction, such that the timing apparatus 120 for determining HARQ feedback information executes the method described in the above method example.

If the timing apparatus 120 for determining HARQ feedback information is the terminal device, the processor 1201 is configured to execute S201 in FIG. 2, S301 in FIG. 3, S401 in FIG. 4, S501 in FIG. 5, S601 in FIGS. 6, and S701 in FIG. 7. The transceiver 1205 is configured to execute S801 in FIG. 8, S901 in FIGS. 9, and S1001 and S1002 in FIG. 10.

In an embodiment, the processor 1201 may include the transceiver configured to implement reception and transmission functions. For instance, the transceiver may be a transmission-reception circuit, an interface, or an interface circuit. The transmission-reception circuit, interface or interface circuit configured to achieve the reception and transmission functions may be separated or integrated. The transmission-reception circuit, interface or interface circuit may be configured to read and write codes/data. Alternatively, the transmission-reception circuit, interface or interface circuit may be configured to transmit or transfer a signal.

In an embodiment, the timing apparatus 120 for determining HARQ feedback information may include a circuit. The circuit may achieve the transmission or reception or communication function in the above method example. The processor and transceiver described in the disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and transceiver may also be manufactured by means of various IC process technologies, such as a complementary metal oxide semiconductor (CMOS), an N-metal oxide semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The timing apparatus for determining HARQ feedback information according to the above examples may be the network device or the terminal device, which does not limit the scope of the timing apparatus for determining HARQ feedback information according to the disclosure. A structure of the timing apparatus for determining HARQ feedback information may not be limited by FIG. 12. The timing apparatus for determining HARQ feedback information may be an independent device or may be part of a large device. For instance, the timing apparatus for determining HARQ feedback information may be: (1) an independent integrated circuit (IC), or a chip, or a chip system, or a subsystem; (2) a set having one or more ICs, where the IC set may also include a storage component configured to store data and a computer program; (3) an ASIC, for instance, a modem; (4) a module that may be embedded in other devices; (5) a reception machine, a terminal device, an intelligent terminal device, a cellular phone, a radio device, a handset, a mobile unit, a vehicle-mounted device, a network device, a cloud device, an artificial intelligence device, etc.; and (6) other devices.

Figure 13:
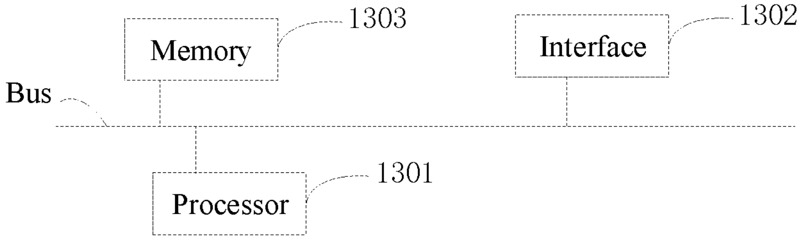
FIG. 13 is a schematic structural diagram of a chip according to an example of the disclosure.

In the case that the timing apparatus for determining HARQ feedback information may be a chip or a chip system, reference may be made to a schematic structural diagram of the chip shown in FIG. 13. The chip shown in FIG. 13 includes a processor 1301 and an interface 1302. One or more processors 1301 are possible, and a plurality of interfaces 1302 are possible.

In the case that the chip is configured to achieve functions of the network device in the example of the disclosure: the interface 1302 is configured to receive the code instruction and transmit the code instruction to the processor; and the processor 1301 is configured to run the code instruction so as to execute the method as shown in FIGS. 2-7.

In the case that the chip is configured to achieve functions of the terminal device in the example of the disclosure: the interface 1302 is configured to receive the code instruction and transmit the code instruction to the processor; and the processor 1301 is configured to run the code instruction so as to execute the method as shown in FIGS. 8-10.

Alternatively, the chip further includes a memory 1303. The memory 1303 is configured to store a computer program and data that are necessary.

Those skilled in the art may further understand that various illustrative logical blocks and steps listed in the examples of the disclosure may be implemented by electronic hardware, computer software, or a combination of both. Whether the function is achieved by hardware or software depends on specific applications and design requirements of an entire system. Those skilled in the art may use different methods to achieve the described functions for each particular application, but such implementation is not considered to be beyond the protection scope of the examples of the disclosure.

The example of the disclosure further provides a communication system. The system includes the timing apparatus for determining HARQ feedback information as the terminal device and the timing apparatus for determining HARQ feedback information as the network device in the example of FIG. 11. Alternatively, the system includes the timing apparatus for determining HARQ feedback information as the terminal device and the timing apparatus for determining HARQ feedback information as the network device in the example of FIG. 12.

The disclosure further provides a non-transitory computer-readable storage medium. The non-transitory computer-readable storage medium stores an instruction. The instruction achieves the functions of any one of the above method examples when being executed by a computer.

The disclosure further provides a computer program product. The computer program product achieves the functions of any one of the above method examples when being executed by a computer.

The above examples may be partially or completely achieved by software, hardware, firmware or any combination thereof. During implementation with software, implementation may be partially or completely conducted in the form of a computer program product. The computer program product includes one or more computer programs. When a computer program is loaded and executed on a computer, a flow or functions according to the example of the disclosure is partially or completely generated. The computer may be a general-purpose computer, a special-purpose computer, a computer network, or other programmable apparatuses. The computer program may be stored in a computer-readable storage medium or transmitted from a computer-readable storage medium to another computer-readable storage medium. For instance, the computer program may be transmitted from a website, a computer, a server or a data center to another website, another computer, another server or another data center in a wired (through a coaxial cable, an optical fiber, or a digital subscriber line (DSL)) or radio (through infrared waves, radio, or microwaves). The computer-readable storage medium may be any available medium that may be accessed by the computer or a data storage device such as a server and a data center that includes one or more available media integrated. The available medium may be a magnetic medium (for instance, a floppy disk, a hard disk, or a magnetic tape), an optical medium (for instance, a high-density digital video disc (DVD)), a semiconductor medium (for instance, a solid state disk (SSD)), etc.

Those of ordinary skill in the art may understand that numerical symbols such as "first" and "second" involved in the disclosure are only for convenience of description, instead of limiting the scope of the examples of the disclosure, and further indicate a sequence.

"At least one" in the disclosure may also be described as "one or more", and "a plurality of" may indicate two, three, four or more, which are not limited by the disclosure. In the example of the disclosure, for a technical feature, technical features in the technical feature are distinguished by "first", "second", "third", "A", "B", "C", "D", etc. The technical features described by the "first", "second", "third", "A", "B", "C" and "D" are not in order of succession or order of size.

The corresponding relation shown in each table in the disclosure may be configured or predefined. Values of information in each table are only illustrative, and may be configured to be other values, which are not limited by the disclosure. When the corresponding relation between information and all parameters is configured, it is not necessary to configure all the corresponding relations indicated in each table. For instance, in the table in the disclosure, the corresponding relation shown in some rows is unnecessary configure. For another instance, appropriate variation and adjustment may be conducted on the basis of the above table, such as splitting and merging. Names of the parameters indicated by headings in the above tables may also be other names that may be understood by a communication apparatus, and values or representations of the parameters may also be other values or representations that may be understood by the communication apparatus. The above tables may also use other data structures during implementation, such as arrays, queues, containers, stacks, linear tables, pointers, linked lists, trees, graphs, structures, classes, heaps and hash tables.

Predefinition in the disclosure may be understood as definition, predefinition, storage, pre-storage, pre-negotiation, pre-configuration, curing, or pre-firing.

Those of ordinary skill in the art may understand that the units and algorithm steps of the instances described in connection with the examples disclosed here can be implemented in electronic hardware, or a combination of computer software and electronic hardware. Whether the functions are executed in hardware or software depends on specific applications and design constraints of the technical solution. Professionals may use different methods to implement the described functions for each specific application, but such implementation shall not be considered to be beyond the scope of the disclosure.

Those skilled in the art may clearly understand that, for the convenience and conciseness of description, reference may be made to a corresponding process in the above method example for a specific operation process of the system, apparatus and unit described above, which will not be repeated here.

In a first aspect, an example of the disclosure provides a timing method for determining HARQ feedback information. The method is performed by a terminal device. The method includes: determining a time position where the HARQ feedback information is located according to indication information. A value number indicated by the indication information is greater than a value indicated by a timing indication domain from a physical downlink shared channel (PDSCH) to the HARQ feedback information in downlink control information (DCI). The value number is a value number of a time unit interval number between the physical downlink shared channel (PDSCH) and the hybrid automatic repeat request (HARQ) feedback information, or the indication information is configured to instruct the terminal device to determine the time position according to a predefined rule.

In the technical solution, the terminal device determines the time position where the HARQ feedback information is located according to the indication information. A value indicated by the indication information is greater than the value indicated by the timing indication domain from the PDSCH to the HARQ feedback information in the DCI. or the time position where the feedback information is located is accurately determined according to the indication information configured to instruct the terminal device according to the predefined rule. Further, reliable transmission of the HARQ feedback information can be ensured.

In a possible example, the indication information includes orthogonal sequence information configured to scramble first DCI and a timing indication domain from the PDSCH to the HARQ feedback information in the first DCI. The determining a time position where the HARQ feedback information is located according to indication information includes: determining the time position where the HARQ feedback information is located according to the orthogonal sequence information and an indicator value of the timing indication domain from the PDSCH to the HARQ feedback information in the first DCI.

In an alternative example, a method for obtaining the orthogonal sequence information includes: obtaining a cyclic redundancy check (CRC) in the first DCI; and descrambling the CRC, and obtaining the orthogonal sequence information.

In a possible example, the determining the time position where the HARQ feedback information is located according to the orthogonal sequence information and an indicator value of the timing indication domain from the PDSCH to the HARQ feedback information in the first DCI includes: splicing the orthogonal sequence information and the indicator value of the timing indication domain from the PDSCH to the HARQ feedback information in the first DCI, and obtaining a spliced value; and determining the time position where the HARQ feedback information is located according to the spliced value.

Alternatively, the indication information includes a timing indication domain from the PDSCH to the HARQ feedback information in second DCI. The determining a time position where the HARQ feedback information is located according to indication information includes: determining the time position where the HARQ feedback information is located according to the predefined rule in response to determining that an indicator value of the timing indication domain from the PDSCH to the HARQ feedback information in the second DCI is a designated value configured to instruct the terminal device to determine the time position according to the predefined rule.

In a possible example, the determining the time position where the HARQ feedback information is located according to the predefined rule includes: obtaining a first available uplink time unit after a reception time unit of PDSCH transmission and with a distance from reception time being greater than or equal to a processing time requirement; and determining the first available uplink time unit to be the time position where the HARQ feedback information is located.

In an alternative example, the indication information includes a timing indication domain from the PDSCH to the HARQ feedback information in third DCI. The determining a time position where the HARQ feedback information is located according to indication information includes: determining the time position where the HARQ feedback information is located according to an indicator value of the timing indication domain from the PDSCH to the HARQ feedback information in the third DCI.

Alternatively, the determining a time position where the HARQ feedback information is located according to indication information includes: determining a value of the time unit interval number between the PDSCH and the HARQ feedback information according to the indication information; and determining the time position where the HARQ feedback information is located according to the value of the time unit interval number.

In a second aspect, an example of the disclosure provides another timing method for determining HARQ feedback information. The method is performed by a network device. The method includes: transmitting indication information to a terminal device. A value number indicated by the indication information is greater than a value indicated by a timing indication domain from a PDSCH to HARQ feedback information in DCI. The value number is a value number of a time unit interval number between the physical downlink shared channel (PDSCH) and the hybrid automatic repeat request (HARQ) feedback information. Alternatively, the indication information is configured to instruct the terminal device to determine a time position where the HARQ feedback information is located according to a predefined rule.

In the technical solution, the network device transmits the indication information indicating that the value number is greater than the value indicated by the timing indication domain from the PDSCH to the HARQ feedback information in the DCI to the terminal device, or transmits the indication information configured to instruct the terminal device to determine the time position where the HARQ feedback information is located according to the predefined rule to the terminal device, such that the terminal device may accurately determine the time position where the HARQ feedback information is located on the basis of the received indication information. Further, reliable transmission of the HARQ feedback information can be ensured.

In a possible example, the indication information includes orthogonal sequence information configured to scramble first DCI and a timing indication domain from the PDSCH to the HARQ feedback information in the first DCI. The timing indication domain from the PDSCH to the HARQ feedback information in the first DCI and the orthogonal sequence information are configured to jointly indicate the time unit interval number between the PDSCH and the HARQ feedback information.

In an alternative example, a method for determining an orthogonal sequence number corresponding to the orthogonal sequence information includes: obtaining a continuous downlink time unit number involved in a frame structure deployed for the terminal device; and determining the orthogonal sequence number according to the continuous downlink time unit number.

Alternatively, the determining the orthogonal sequence number according to the continuous downlink time unit number includes: determining the orthogonal sequence number to be 2 in response to determining that the continuous downlink time unit number is smaller than or equal to 32; or determining the orthogonal sequence number to be 4 in response to determining that the continuous downlink time unit number is greater than 32 and smaller than or equal to 64.

In a possible example, the indication information includes a timing indication domain from the PDSCH to the HARQ feedback information in second DCI. An indicator value of the timing indication domain from the PDSCH to the HARQ feedback information in the second DCI is a designated value configured to instruct the terminal device to determine the time position according to the predefined rule.

In an alternative example, the indication information includes a timing indication domain from the PDSCH to the HARQ feedback information in third DCI. The method further includes: obtaining a continuous downlink time unit number involved in a frame structure deployed for the terminal device; and determining a bit length of the timing indication domain from the PDSCH to the HARQ feedback information in the third DCI according to the continuous downlink time unit number.

Alternatively, the determining a bit length of the timing indication domain from the PDSCH to the HARQ feedback information according to the continuous downlink time unit number includes: determining the bit length of the timing indication domain from the PDSCH to the HARQ feedback information in the third DCI to be 4 bits in response to determining that the continuous downlink time unit number is smaller than or equal to 32; or determining the bit length of the timing indication domain from the PDSCH to the HARQ feedback information in the third DCI to be 5 bits in response to determining that the continuous downlink time unit number is greater than 32 and smaller than or equal to 64.

In a third aspect, an example of the disclosure provides a timing apparatus for determining HARQ feedback information. The timing apparatus for determining HARQ feedback information has some or all functions of a terminal device in the method according to the first aspect. For instance, the timing apparatus for determining HARQ feedback information may have functions in some or all examples of the disclosure, or may have a function of independently implementing any one of the examples of the disclosure. The function may be achieved by hardware or by executing corresponding software with hardware. The hardware or software includes one or more units or modules corresponding to the above functions.

In a fourth aspect, an example of the disclosure provides another timing apparatus for determining HARQ feedback information. The timing apparatus for determining HARQ feedback information has some or all functions of a network device in the method instance according to the second aspect. For instance, the timing apparatus for determining HARQ feedback information may have functions in some or all examples of the disclosure, or may have a function of independently implementing any one of the examples of the disclosure. The function may be achieved by hardware or by executing corresponding software with hardware. The hardware or software includes one or more units or modules corresponding to the above functions.

In a fifth aspect, an example of the disclosure provides a timing apparatus for determining HARQ feedback information. The apparatus includes a processor. The processor executes the method according to the first aspect when calling a computer program in a memory.

In a sixth aspect, an example of the disclosure provides a timing apparatus for determining HARQ feedback information. The apparatus includes a processor. The processor executes the method according to the second aspect when calling a computer program in a memory.

In a seventh aspect, an example of the disclosure provides a timing apparatus for determining HARQ feedback information. The apparatus includes a processor and a memory. The memory stores a computer program. The processor is configured to execute the computer program stored in the memory, such that the apparatus executes the method according to the first aspect.

In an eighth aspect, an example of the disclosure provides a timing apparatus for determining HARQ feedback information. The apparatus includes a processor and a memory. The memory stores a computer program. The processor is configured to execute the computer program stored in the memory, such that the apparatus executes the method according to the second aspect.

In a ninth aspect, an example of the disclosure provides a timing apparatus for determining HARQ feedback information. The apparatus includes a processor and an interface circuit. The interface circuit is configured to receive a code instruction and transmit the code instruction to the processor. The processor is configured to run the code instruction so as to execute the method according to the first aspect.

In a tenth aspect, an example of the disclosure provides a timing apparatus for determining HARQ feedback information. The apparatus includes a processor and an interface circuit. The interface circuit is configured to receive a code instruction and transmit the code instruction to the processor. The processor is configured to run the code instruction so as to execute the method according to the second aspect.

In an eleventh aspect, an example of the disclosure provides a communication system. The system includes the timing apparatus for determining HARQ feedback information according to the third aspect and the timing apparatus for determining HARQ feedback information according to the fourth aspect. Alternatively, the system includes the timing apparatus for determining HARQ feedback information according to the fifth aspect and the timing apparatus for determining HARQ feedback information according to the sixth aspect. Alternatively, the system includes the timing apparatus for determining HARQ feedback information according to the seventh aspect and the timing apparatus for determining HARQ feedback information according to the eighth aspect. Alternatively, the system includes the timing apparatus for determining HARQ feedback information according to the ninth aspect and the timing apparatus for determining HARQ feedback information according to the tenth aspect.

In a twelfth aspect, an example of the disclosure provides a non-transitory computer-readable storage medium. The non-transitory computer-readable storage medium is configured to store an instruction used by the network device. The terminal device executes the method according to the first aspect when the instruction is executed.

In a thirteenth aspect, an example of the disclosure provides a non-transitory computer-readable storage medium. The non-transitory computer-readable storage medium is configured to store an instruction used by the terminal device. The network device executes the method according to the second aspect when the instruction is executed.

In a fourteenth aspect, the disclosure further provides a computer program product including a computer program. A computer executes the method according to the first aspect when the computer program product runs on the computer.

In a fifteenth aspect, the disclosure further provides a computer program product including a computer program. A computer executes the method according to the second aspect when the computer program product runs on the computer.

In a sixteenth aspect, the disclosure provides a chip system. The chip system includes at least one processor and an interface, and is configured to enable the network device to achieve the functions involved in the first aspect, for instance, the function of determining or processing at least one of data and information involved in the above method. In a possible design, the chip system further includes a memory. The memory is configured to store a computer program and data necessary for the network device. The chip system may be composed of chips, or may include a chip and other discrete devices.

In a seventeenth aspect, the disclosure provides a chip system. The chip system includes at least one processor and an interface, and is configured to enable the terminal device to achieve the functions involved in the second aspect, for instance, the function of determining or processing at least one of data and information involved in the above method. In a possible design, the chip system further includes a memory. The memory is configured to store a computer program and data necessary for the terminal device. The chip system may be composed of chips, or may include a chip and other discrete devices.

In an eighteenth aspect, the disclosure provides a computer program. A computer executes the method according to the first aspect when the computer program runs on the computer.

In a nineteenth aspect, the disclosure provides a computer program. A computer executes the method according to the second aspect when the computer program runs on the computer.

What are described above are merely specific embodiments of the disclosure, and are not intended to limit the protection scope of the disclosure. Any changes or substitutions that can be easily made by those skilled in the art within the scope of the technology disclosed in the disclosure shall fall within the protection scope of the disclosure. Thus, the protection scope of the disclosure shall be subject to the protection scope of the claims.

What is claimed is:

1. A timing method for determining hybrid automatic repeat request (HARQ) feedback information, performed by a terminal device, the method comprising:

determining a time position where the HARQ feedback information is located according to indication information;

wherein the indication information is configured to instruct the terminal device to determine the time position according to a value number indicated by the indication information, the value number indicated by the indication information is greater than a value indicated by a timing indication domain from a physical downlink shared channel (PDSCH) to the HARQ feedback information in downlink control information (DCI), wherein the value number is a value number of a time unit interval number between the PDSCH and the HARQ feedback information;

wherein in a case where the indication information comprises orthogonal sequence information configured to scramble first DCI and the timing indication domain from the PDSCH to the HARQ feedback information in the first DCI, determining the time position comprises:

determining the time position according to the orthogonal sequence information and an indicator value of the timing indication domain from the PDSCH to the HARQ feedback information in the first DCI.

2. The method according to claim 1, wherein a method for obtaining the orthogonal sequence information comprises: obtaining a cyclic redundancy check (CRC) in the first DCI; and descrambling the CRC, and obtaining the orthogonal sequence information.

3. The method according to claim 1, wherein determining the time position according to the orthogonal sequence information and the indicator value comprises:

splicing the orthogonal sequence information and the indicator value;

obtaining a spliced value; and determining the time position according to the spliced value.

4. The method according to claim 1, wherein in a case where the indication information comprises a timing indication domain from the PDSCH to the HARQ feedback information in second DCI, determining the time position according to the indication information comprises:

determining the time position according to a predefined rule-on a condition that determining that an indicator value of the timing indication domain from the PDSCH to the HARQ feedback information in the second DCI is a designated value configured to instruct the terminal device to determine the time position according to the predefined rule.

5. The method according to claim 4, wherein determining the time position according to the predefined rule comprises:

obtaining a first available uplink time unit after a reception time unit of a PDSCH transmission and with a distance from reception time being greater than or equal to a processing time requirement; and determining the first available uplink time unit to be the time position.

6. The method according to claim 1, wherein in a case where the indication information comprises a timing indication domain from the PDSCH to the HARQ feedback information in third DCI, determining the time position where the HARQ feedback information is located according to the indication information comprises:

determining the time position according to an indicator value of the timing indication domain from the PDSCH to the HARQ feedback information in the third DCI.

7. The method according to claim 1, wherein determining the time position according to the indication information comprises:

determining a value of the time unit interval number between the PDSCH and the HARQ feedback information according to the indication information; and determining the time position according to the value of the time unit interval number.

8. A timing method for determining hybrid automatic repeat request (HARQ) feedback information, performed by a network device, the method comprising:

transmitting indication information to a terminal device; wherein the indication information is configured to instruct the terminal device to determine the time position according to a value number indicated by the indication information, the value number indicated by the indication information is greater than a value indicated by a timing indication domain from a physical downlink shared channel (PDSCH) to the HARQ feedback information in downlink control information (DCI), wherein the value number is a value number of a time unit interval number between the PDSCH and the HARQ feedback information;

wherein in a case where the indication information comprises orthogonal sequence information configured to scramble first DCI and the timing indication domain from the PDSCH to the HARQ feedback information in the first DCI, the timing indication domain from the PDSCH to the HARQ feedback information in the first DCI and the orthogonal sequence information are configured to jointly indicate the time unit interval number.

9. The method according to claim 8, wherein a method for determining an orthogonal sequence number corresponding to the orthogonal sequence information comprises:

obtaining a continuous downlink time unit number involved in a frame structure deployed for the terminal device; and determining the orthogonal sequence number according to the continuous downlink time unit number.

10. The method according to claim 9, wherein determining the orthogonal sequence number according to the continuous downlink time unit number comprises:

determining the orthogonal sequence number to be 2 on a condition that determining that the continuous downlink time unit number is smaller than or equal to 32; or determining the orthogonal sequence number to be 4 on a condition that determining that the continuous downlink time unit number is greater than 32 and smaller than or equal to 64.

11. The method according to claim 8, wherein in a case where the indication information comprises a timing indication domain from the PDSCH to the HARQ feedback information in second DCI, an indicator value of the timing indication domain from the PDSCH to the HARQ feedback information in the second DCI is a designated value configured to instruct the terminal device to determine the time position according to a predefined rule.

12. The method according to claim 8, wherein in a case where the indication information comprises a timing indication domain from the PDSCH to the HARQ feedback information in third DCI, the method further comprises:

obtaining a continuous downlink time unit number involved in a frame structure deployed for the terminal device; and determining a bit length of the timing indication domain from the PDSCH to the HARQ feedback information in the third DCI according to the continuous downlink time unit number.

13. The method according to claim 12, wherein determining the bit length of the timing indication domain from the PDSCH to the HARQ feedback information in the third DCI according to the continuous downlink time unit number comprises:

determining the bit length to be 4 bits-on a condition that determining that the continuous downlink time unit number is smaller than or equal to 32; or determining the bit length to be 5 bits-on a condition that determining that the continuous downlink time unit number is greater than 32 and smaller than or equal to 64.

14. A timing apparatus for determining hybrid automatic repeat request (HARQ) feedback information, comprising a processor and a memory, wherein the memory stores a computer program, and the processor is configured to:

determine a time position where the HARQ feedback information is located according to indication information;

wherein the indication information is configured to instruct a terminal device to determine the time position according to a value number indicated by the indication information, the value number indicated by the indication information is greater than a value indicated by a timing indication domain from a physical downlink shared channel (PDSCH) to the HARQ feedback information in downlink control information (DCI), wherein the value number is a value number of a time unit interval number between the PDSCH and the HARQ feedback information;

wherein in a case where the indication information comprises orthogonal sequence information configured to scramble first DCI and the timing indication domain from the PDSCH to the HARQ feedback information in the first DCI, the processor is further configured to:

determine the time position according to the orthogonal sequence information and an indicator value of the timing indication domain from the PDSCH to the HARQ feedback information in the first DCI.

15. A timing apparatus for determining the HARQ feedback information, comprising a processor and a memory, wherein the memory stores a computer program, and the processor is configured to execute the computer program stored in the memory, such that the apparatus executes the method according to claim 8.

16. A timing apparatus for determining the HARQ feedback information, comprising a processor and an interface circuit, wherein the interface circuit is configured to receive a code instruction and transmit the code instruction to the processor; and the processor is configured to run the code instruction so as to execute the method according to claim 1.

17. A timing apparatus for determining the HARQ feedback information, comprising a processor and an interface circuit, wherein the interface circuit is configured to receive a code instruction and transmit the code instruction to the processor; and the processor is configured to run the code instruction so as to execute the method according to claim 8.

18. A non-transitory computer-readable storage medium, being configured to store an instruction, wherein the instruction, when executed, causes a processor to implement the method according to claim 8.

* * * * *